United States Patent Office 3,769,298
Patented Oct. 30, 1973

3,769,298
SUBSTITUTED AMINOMETHYLCARBAZOLES
James M. McManus, Old Lyme, and Max W. Miller, Stonington, Conn., assignors to Pfizer Inc., New York, N.Y.
No Drawing. Continuation of abandoned application Ser. No. 830,104, June 3, 1969. This application Apr. 2, 1971, Ser. No. 130,823
Int. Cl. C07d 27/68
U.S. Cl. 260—315     3 Claims

ABSTRACT OF THE DISCLOSURE

Substituted aminomethylcarbazoles effective in the prevention and treatment of coccidiosis.

CROSS-REFERENCE TO RELATED APPLICATION

This application is a continuation of copending application Ser. No. 830,104, filed June 3, 1969, and now abandoned.

BACKGROUND OF THE INVENTION

This invention relates generally to new chemical compounds which are useful in treating and preventing coccidiosis. More particularly, it is concerned with novel substituted aminomethylcarbazoles and their effectiveness in the prevention and treatment of coccodiosis.

Coccidiosis, a poultry disease, is caused by several species of protozoan parasites of the genus Eimeria, such as *E. necatrix, E. acervulina, E. maxima, E. hagani*, and *E. tenella. E. tenella* is the causative agent of a severe and often fatal infection of the ceca of chickens which is manifested by extensive hemorrhage, accumulation of blood in the ceca, and the passage of blood in the droppings. Essentially, coccidiosis is an intestinal disease which is disseminated by birds picking up the infectious organism in droppings on contaminated litter or ground. By damaging the intestinal wall the host animal is unable to utilize its food, goes off its feed, and in untreated cases the disease terminates in either the death of the animal or the survival of unthrifty birds known commonly as "culls."

SUMMARY OF THE INVENTION

It has now been discovered that certain substituted aminomethylcarbazoles posses a high degree of activity against the above enumerated protozoa which cause coccidiosis. It is one object of the present invention to provide such compounds. A further object is the provision of a method which is useful in the treatment or prevention of coccidiosis which comprises the utilization of the herein disclosed novel compounds. Further objects will become evident from the ensuing detailed description of the invention.

The novel substituted aminomethylcarbazoles disclosed herein are selected from the group consisting of 1,2,3,4-tetrahydro-1-aminomethylcarbazole bases of the formula:

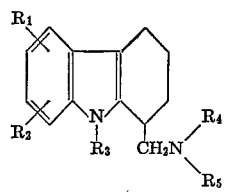

and the pharmaceutically-acceptable acid addition salts thereof, wherein $R_1$ and $R_2$ are each selected from the group consisting of hydrogen, fluorine, chlorine, bromine, trifluoromethyl, hydroxy, alkyl, alkoxy, alkanoyl, alkanoylamino and alkythio each having up to four carbon atoms; $R_1$ and $R_2$ when taken together form a methylene dioxy or ethylene dioxy ring; and $R_3$, $R_4$ and $R_5$ are each selected from the group consisting of hydrogen and alkyl having up to four carbon atoms.

DETAILED DESCRIPTION OF THE INVENTION

The compounds of the instant invention can be prepared by alternate synthetic schemes. The preferred method for the synthesis of compounds derived from a primary amine, where $R_4$ and $R_5$ are hydrogen and $R_3$ is also hydrogen, may be represented by the following equations:

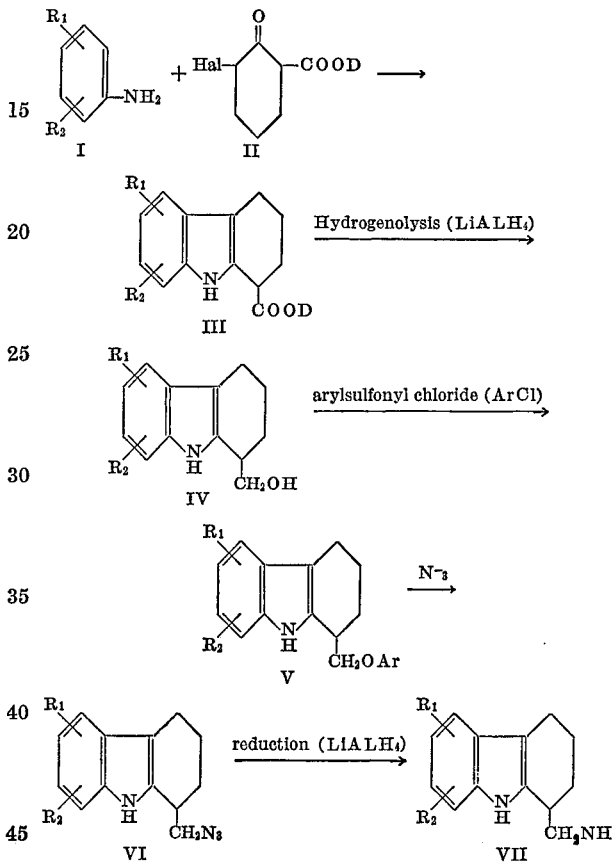

wherein $R_1$ and $R_2$ are previously defined, Hal is chloro, bromo or iodo, D represents a displacable group such as an alkyl group having up to four carbon atoms and ArCl represents an arylsulfonyl chloride.

The starting materials for the synthesis of the compounds of the present invention, substituted anilines (I) and 2-carbalkoxy-6-halocyclohexanones (II) are readily available commercially or may easily be prepared. The alkoxy moiety can contain up to four carbon atoms and the halo moiety can be chloro, bromo, or iodo. Examples of such compounds are 2-carbethoxy-6-bromocyclohexanone, 2-carbethoxy-6-iodocyclohexanone and 2-carbpropoxy-6-bromocyclohexanone, to mention a few.

The substituted 1-carbalkoxy - 1,2,3,4 - tetrahydrocarbazole compounds (III) can be prepared by reaction of a suitably substituted aniline (I) with a 2-carbalkoxy-6-halocyclohexanone(II). This reaction is preferably carried out under vacuum at temperatures of from about 100 to 200 degrees C., the preferred temperature is about 150 degrees C., for times of about 45 minutes to about 1.5 hours. An equimolar ratio of the substituted aniline (I) to the 2-carbalkoxy-6-halo-cyclohexanone (II) can be used if desired, but it may frequently be preferred to use two or even more moles of I for each mole of II. The product (III) is allowed to cool to room temperature and can be isolated by extraction from the reaction mixture into an organic solvent such as diethyl ether and the like, followed by washing with a dilute inorganic acid, such as hydrochloric acid and then drying the water from the extract. The organic solvent is then removed by suitable means, e.g., distillation at pressure of below 1 mm. Hg.

The 1-carbalkoxy-1,2,3,4-tetrahydrocarbazole (III) is then subjected to hydrogenolysis, e.g., with lithium aluminum hydride in dry tetrahydrofuran under a nitrogen atmosphere, to form a 1-hydroxymethyl-1,2,3,4-tetrahydrocarbazole compound (IV). An equimolar ratio of III to lithium aluminum hydride can be used if desired but it may be preferred to use two or even more moles of lithium aluminum hydride. The hydride may be added dropwise, e.g., over a period of 15 to 60 minutes. The mixture is then stirred at room temperature for about 15 to 120 minutes. The reaction mixture is then cooled and the excess hydride, if present, decomposed by the addition of water. The product IV is then isolated by filtration and concentration of the filtrate to dryness. The residue is further purified by treatment with an organic solvent such as diethyl ether and the like, followed by evaporation of the solvent yielding the desired product (IV). Further purification can be carried out by recrystallization from toluene or any other suitable organic solvent if desired.

The 1 - hydroxymethyl - 1,2,3,4 - tetrahydrocarbazole compound (IV) is dissolved in pyridine, or any other suitable solvent, and the solution cooled to about 0 to −5 degrees C. It is then reacted with an arylsulfonyl chloride, e.g., p-toluenesulfonyl chloride, to form a 1,2,3,4-tetrahydro-1-carbazolylmethyl arylsulfonate (V). An equimolar ratio of V to the arylsulfonyl chloride can be used if desired but it may be preferred to use two or even more moles of the arylsulfonyl chloride for each mole of IV. The desired product is obtained after stirring the reaction mixture for about 1.5 to 4.0 hours at about 0 to about 10 degrees C. and then diluting with water. The precipitated solid (V) is filtered and dried. Further recrystallization may be carried out by the use of ethanol or any other suitable organic solvent if desired.

The 1,2,3,4-tetrahydro - 1 - carbazolylmethyl arylsulfonate (V) is slurried in a suitable organic solvent-water mixture, e.g., a mixture of ethanol and water, and added to sodium azide to form 1,2,3,4-tetrahydro-1-azidomethylcarbazole, (VI). A molar ratio of 2–3 moles of sodium azide to one mole of V is desirable at this point. The mixture is heated to reflux for at least 12 to 36 hours after which an additional quantity of from about 1 to 2 moles of sodium azide is added. The refluxing is continued for about 4 to 6 hours, followed by cooling and dilution with water. The resulting product (VI) obtained by filtration and drying may be recrystallized from dilute ethanol or any suitable organic solvent if desired.

The 1,2,3,4-tetrahydro - 1 - azidomethylcarbazole (VI) is then reacted with a suitable reducing agent, e. g., lithium aluminum hydride in dry tetrahydrofuran under nitrogen. An equimolar ratio of VI to the hydride can be used if desired, but it may be preferred to use two or even more moles of the hydride per mole of VI. The reaction mixture is stirred at room temperature for about 0.5 to 4 hours to form an aminomethyl-1,2,3,4-tetrahydrocarbazole (VII). The reaction mixture is then cooled and the excess hydride, if present, decomposed by the addition of water. The product VII is isolated by filtration and subsequent treatment with an organic solvent, such as ethyl acetate. The resultant product (VII) may be recrystallized from acetonitrile or any other suitable organic solvent if desired.

The foregoing reaction sequence covers the situation wherein $R_3$ is hydrogen. Where $R_3$ is alkyl essentially the same reaction sequence is followed with the exception that a separate step is required from the introduction of the alkyl group in Compound III.

The alkylation of Compound III is carried out by dissolving it in a solvent such as dimethylformamide or dimethylsulfoxide and adding an equimolar amount of a 50% sodium hydride suspension. After allowing the mixture to stir at room temperature for about 20 minutes an equimolar quantity of the alkyl halide is added dropwise over about a 30-minute period. The reaction mixture is heated from about 60 to about 100 degrees C. for one to four hours. It is then cooled and added to an equal volume of water. The desired product is then extracted with ether of any other suitable organic solvent, and the organic phase separated and dried over sodium sulfate. Removal of the solvent in vacuo provides the product, which is purified by distillation under vacuum. Such alkylated compounds are then carried through the remaining steps in the reaction scheme as previously outlined to yield Compound VII having an alkyl group rather than hydrogen on the indole nitrogen.

The foregoing sequences have provided Compounds VII having a primary exocyclic amine function. These may be in turn alkylated to provide compounds having one or two alkyl groups of up to four carbon atoms on the exocyclic nitrogen:

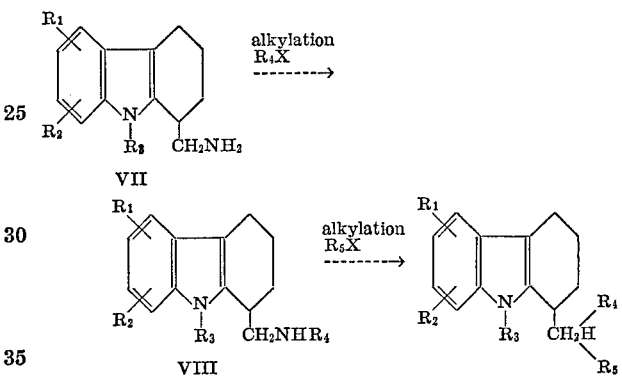

wherein $R_3$ is hydrogen or alkyl as before and $R_4$ and $R_5$ are alkyl in this case.

The alkylation of the exocyclic amine is carried out by adding to a solution of the 1-aminomethyl-1,2,3,4-tetrahydrocarbazole (VII) in dimethylformamide or dimethylsulfoxide, an equimolar quantity of diisopropylethylamine followed by the dropwise addition of an equimolar amount of the alkyl halide ($R_4X$). The resulting reaction mixture is heated to about 50–100 degrees C for 15–60 minutes, followed by cooling and the addition of an equal volume of water. The suspension is made basic, and the product is extracted with ether or any other suitable organic solvent. The organic layer is dried, and the solvent removed in vacuo. The residual material Compound VIII is further purified by distillation or recrystallization.

The above procedure is repeated for the $R_5$ alkylation to produce Compound IX.

An alternate sequence for the conversion of Compound III to the final products of the present invention involves direct ammonolysis, followed by reduction of the resulting amide:

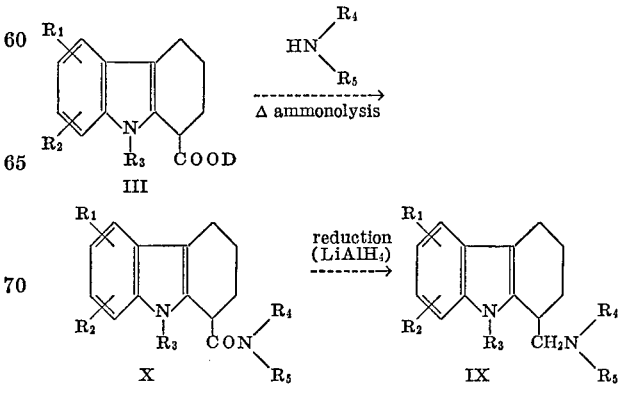

wherein $R_1$, $R_2$, $R_3$, $R_4$, $R_5$ and D are previously defined.

The above ammonolysis step is effected by dissolving the 1-carboalkoxy-1,2,3,4-tetrahydrocarbazole III in isopropanol to which is added an excess, for 1–5 equivalents of the appropriate amine ($R_4R_5NH$) or ammonia, and the mixture is sealed in an autoclave. The reaction temperature is raised to 100–175 degrees C. for a period of 1–5 hours, after which time the reaction is cooled, and the solvent and excess amine removed in vacuo. The amide product (X) is then purified by distillation or recrystallization from a suitable organic solvent.

The 1,2,3,4-tetrahydro-1-carboxamidocarbazole (X) is then reduced e.g., lithium aluminum hydride in dry tetrahydrofuran, to form a 1,2,3,4-tetrahydro-1-aminomethylcarbazole (IX). Equimolar quantities of X and lithium aluminum hydride may be used but it may be preferred to use two or even more moles of the hydride for each mole of X. The reaction mixture is allowed to stir at room temperature for about 48 hours followed by decomposition of the excess hydride, if present. The mixture is filtered and the solids washed with a suitable solvent, e.g., hot tetrahydrofuran. The washings are combined with the original filtrate and concentrated to a small volume. The residue is then triturated with ethyl acetate to give a 1,2,3,4-tetrahydro-1-aminomethylcarbazole. The product may be further purified by recrystallization from acetonitrile or any other suitable organic solvent if desired.

The acid addition salts of the compounds of the present invention can be formed by treating solutions of the free base with the desired acid. It is particularly convenient to use diethyl ether and acetone solutions of said bases and to employ aqueous solutions of said acids.

The acids which can be used to prepare the acid addition salts are preferably those which produce when combined with the free base, salts whose aninos are relatively innocuous to the animal organism in the therapeutic doses of the salts, so that beneficial physiological properties inherent in the free base are not vitiated by side effects ascribable to the anions. Those skilled in the art are well aware of the identity of these acids whose acid addition salts yield anions which are relatively innocuous as aforesaid. However, when the products are the salts of toxic acids, they are readily converted to the free base by treatment with a strong base such as dilute sodium hydroxide.

Preferred pharmaceutically-acceptable acid addition salts are those derived from mineral acids such as hydrochloric acid, hydrobromic acid, hydiodic acid, nitric acid, phosphoric acid and sulfuric acid; and organic acids such as acetic acid, citric acid, tartaric acid, lactic acid, maleic acid and the like, giving the hydrochloride, hydrobromide, hydroiodide, nitrate, phosphate or acid phosphate, sulfate or bisulfate, acetate, citrate or acid citrate, tartrate or bitartrate, and maleate salts respectively.

The compounds disclosed in this invention may be orally administered to poultry in a suitable carrier. It is generally convenient and therefore preferred to add the agent to poultry feed so that a therapeutic dosage of the agent is ingested with the daily poultry ration. The agent may be added directly to the feed as such or in the form of a premix or concentrate. A premix or concentrate of therapeutic agent in a carrier is commonly employed for the inclusion of the agent in the feed. Suitable carriers are liquid or solid, as desired, such as water, various meals, for example soybean oil meal, corn meal, cotton seed oil meal, sunflower seed meal, linseed oil meal, corncob meal and mineral mixes such as are commonly employed in poultry feeds. A particularly effective carrier is the poultry feed itself, that is, a small portion of poultry feed. The carrier facilitates uniform distribution of the active materials in the finished feed with which the premix is blended. This is important because only a small proportion of the potent present agent is required. It is important that the active compound be thoroughly blended into the premix, and subsequently the feed. In this respect, the agent may be dispersed or dissolved in a suitable oily vehicle such as soybean oil, corn oil, cottonseed oil, and the like or in a volatile organic solvent and then blended into the carrier. It will be appreciated that the proportions of active material in the concentrate are capable of wide variation since the amount of agent in the finished feed may be adjusted by blending the appropriate proportion of premix with the feed to obtain a desired level of therapeutic agent.

These compounds are administered in an effective amount below the lethal level and preferably in the range of from about 2 to 10 mg. per chick daily. Such levels are achieved conveniently by providing a concentration of the active agent between about 0.01 and 0.05% by weight in the feed.

Of course, the above-mentioned feed compositions may also contain other effective therapeutic agents such as antibiotics and sulfa compounds which may promote growth and the general health of the poultry.

The following examples are given by way of illustration and are not to be construed as limitations of this invention, many variations of which are possible within the scope and spirit thereof.

EXAMPLE I

A mixture consisting of 18 g. (0.0723 mole) of 2-carbethoxy-6-bromocyclohexanone and 16.2 g. (0.1735 mole) of aniline was heated in vacuo for one hour at an oil-bath temperature of 150 degrees C. Upon completion of this step, the reaction mixture was cooled to room temperature ($\sim 25°$ C.) and 250 ml. of diethyl ether was added thereto, followed by filtration to remove the resulting solids. The separated ether layer was then washed with a dilute hydrochloric acid solution, followed by water, and subsequently dried over anhydrous sodium sulfate. After removal of the solvent by means of evaporation under reduced pressure, there were obtained a residual oil that was distilled in vacuo to afford 9.2 g. of 1-carbethoxy-1,2,3,4-tetrahydrocarbazole, B.P. 170–180° C./0.45–0.50 mm. Hg.

*Analysis.*—Calcd. for $C_{15}H_{17}O_2N$ (percent): C, 74.04; H, 7.04; N, 5.76. Found (percent): C, 73.73; H, 6.84; N, 5.63.

To a suspension of 2.03 g. (0.0534 mole) of lithium aluminum hydride in 50 ml. of dry tetrahydrofuran, there were added dropwise 6.5 g. of 1-carbethoxy-1,2,3,4-tetrahydrocarbazole in 50 ml. of the same said solvent, while keeping the entire system under a dry nitrogen atmosphere. The addition step was complete in about 45 minutes. after which time the reaction mixture was allowed to stir at room temperature for 15 minutes and then heated to reflux for an additional 20 minutes. The spent reaction mixture was then cooled to room temperature ($\sim 25°$ C.) and the excess hydride present in the mixture was decomposed by the cautious addition of water. The solids that formed at this point were then removed by filtration, and the filtrate was subsequently concentrated in vacuo to near dryness. Upon redissolving the resulting residue in diethyl ether and drying the latter solution over anhydrous sodium sulfate, followed by removal of the ether solvent via evaporation under reduced pressure, there were obtained 4.4 g. of 1-hydroxymethyl-1,2,3,4-tetrahydrocarbazole, M.P. 101.5–103° C. after recrystallization from toluene.

*Analysis.*—Calcd. for $C_{13}H_{15}ON$ (percent): C, 77.58; H, 7.51; N, 6.96. Found (percent): C, 77.48; H, 7.51; N, 7.00.

Four grams (0.0199 mole) of the above alcohol product were then dissolved in 50 ml. of pyridine and the resulting solution was cooled in an ice-salt bath. To the cooled solution, there were added 4.94 g. (0.0258 mole) of p-toluenesulfonyl chloride in one-full portion. The resulting solution was then allowed to stir at ice-bath temperatures for 2.5 hours, followed by dilution with water. After collecting the precipitated solid on a filter funnel and air-drying, there were obtained 5.4 g. of 1,2, 3,4-tetrahydro-1-carbazolylmethyl p-tosylate, M.P. 129.5–131° C. (the melting point was raised to 133–134° C. after recrystallization from ethanol).

Analysis.—Calcd. for $C_{20}H_{21}O_3NS$ (percent): C, 77.58; H, 7.51; N, 6.96. Found (percent): C, 67.48; H, 6.14; N, 3.91.

To a slurry consisting of 470 mg. (0.00132 mole) of the above p-tosylate in 15 ml. of ethanol and 5 ml. of water, there was added 178 mg. (0.00274 mole) of sodium azide, and the resulting mixture was then heated to reflux for 24 hours. At the end of this time, an additional 356 mg. of sodium azide was added and refluxing was continued for another four hours thereafterwards. Upon completion of this step, the reaction mixture was cooled to room temperature (~25° C.) and subsequently diluted with water. The resulting solid material was then collected by means of filtration, dried and recrystallized from dilute aqueous ethanol to afford 127 mg. of 1,2,3,4-tetrahydro-1-azidomethyl-carbazole, M.P. 102–103.5° C.

Analysis.—Calcd. for $C_{13}H_{14}N_4$ (percent): C, 69.00; H, 6.24; N, 24.76. Found (percent): C, 69.05; H, 6.05; N, 24.53.

To a slurry of 874 mg. (0.023 mole) of lithium aluminum hydride in 50 ml. of tetrahydrofuran, there were added in a dropwise manner 2.6 g. (0.0115 mole) of 1,2,3,4 - tetrahydro-1-azidomethylcarbazole, prepared as described above, dissolved in 25 ml. of the same said solvent, while keeping the entire system in a dry nitrogen atmosphere. The addition step required approximately twenty minutes, at the end of which time the reaction mixture was allowed to stir for a further hour while still at room temperature (~25° C.). After cooling in the usual manner, the excess hydride present was decomposed by the cautious addition of water. The solids thus obtained were collected by filtration and washed with hot tetrahydrofuran solvent. After combining the washings with the original filtrate and concentrating the resulting solution to a small volume, there was obtained a residue which on subsequent trituration with ethyl acetate gave 2.1 g. of 1,2,3,4-tetrahydro-1-aminomethylcarbazole, M.P. 207–212° C. After one recrystallization from acetonitrile there were obtained 1.6 g. of the pure product, M.P. 215–216.5° C.

Analysis.—Calcd. for $C_{13}H_{16}N_2$ (percent): C, 77.96; H, 8.05; N, 13.99. Found (percent): C, 78.02; H, 77.71; N, 13.99.

EXAMPLE II

The reaction sequence outlined in Example I is carried out with the appropriate methoxy-aniline in place of aniline at identical mole ratios and the following substituted aminocarbazole are obtained.

6-methoxy - 1,2,3,4 - tetrahydro-1-aminomethylcarbazole, M.P. 186–187° C.

Analysis.—Calcd. for $C_{14}H_{18}ON_2$ (percent): C, 73.01; H, 7.88; N, 12.17. Found (percent): C, 73.11; H, 7.98; N, 12.17.

7 - methoxy - 1,2,3,4 - tetrahydro-1-aminomethylcarbazole, M.P. 159.5–161° C.

Analysis.—Calcd. for $C_{14}H_{18}ON_2$ (percent): C, 73.01; H, 7.88; N, 12.17. Found (percent): C, 73.62; H, 7.94; N, 11.45.

EXAMPLE III

The reaction sequence as outlined in Example I is carried out with the appropriate dimethoxy-aniline in place of aniline at identical mole ratios and the following compounds are obtained:

6,8 - dimethoxy - 1,2,3,4 - tetrahydro-1-aminomethyl-carbazole, M.P. 157.7–158.5° C.

Analysis.—Calcd. for $C_{15}H_{20}O_2N_2$ (percent): C, 69.20; H, 7.74; N, 10.76. Found (percent): C, 69.38; H, 7.86; N, 10.68.

6,7 - dimethoxy - 1,2,3,4 - tetrahydro-1-aminomethyl-carbazole, M.P. 115–117° C.

Analysis.—Calcd. for $C_{15}H_{20}O_2N_2$ (percent): C, 69.20; H, 7.74; N, 10.76. Found (percent): C, 68.81; H, 7.63; N, 10.23.

EXAMPLE IV

In an analogous manner to the procedure of Example I, 6,7-methylenedioxy-1,2,3,4-tetrahydro-1-aminomethyl-carbazole, M.P. 216–217° C., is prepared, using 3,4,-methylenedioxy aniline in place of aniline.

Analysis.—Calcd. for $C_{14}H_{16}O_2N_2$ (percent): C, 68.83; H, 6.60; N, 11.47. Found (percent): C, 69.19; H, 6.58; N, 11.57.

EXAMPLE V

Using the appropriate fluoro-aniline 7-fluoro-1,2,3,4-tetrahydro-1-aminomethylcarbazole, M.P. 190–191.5° C., is prepared in a manner similar to that given in Example I.

Analysis.—Calcd. for $C_{13}H_{15}N_2F$ (percent): C, 71.53; H, 6.93; N, 12.84. Found (percent): C, 71.84; H, 7.01; N, 13.16.

EXAMPLE VI

Following the reaction sequence as outlined in Example I, with the appropriate thiomethyl-aniline being used, 6 - thiomethyl-1,2,3,4-tetrahydro-1-aminomethylcarbazole, M.P. 177–178° C. is prepared.

Analysis.—Calcd. for $C_{14}H_{18}SN_2$ (percent): C, 68.25; H, 7.36; N, 11.37. Found (percent): C, 68.80; H, 7.29; N, 11.66.

EXAMPLE VII

Following the procedure in Example I and substituting the appropriate aniline derivative the following additional aminomethylcarbazoles are prepared:

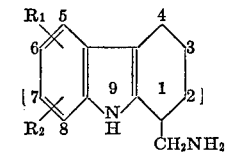

| $R_1$ | $R_2$ |
|---|---|
| 5-F | 6-F |
| 5-F | H |
| 5-Cl | 6-Cl |
| 6-Cl | H |
| 6-Br | H |
| 6-Br | 8-Br |
| 6-CF$_3$ | H |
| 8-CF$_3$ | H |
| 6-CF$_3$ | 8-CF$_3$ |
| 5-OH | H |
| 6-OH | H |
| 5-O | 7-OH |
| 5-CH$_3$ | H |
| 8-CH$_3$ | H |
| 6-CH$_3$ | 8-CH$_3$ |
| 6-CH$_3$CH$_2$ | H |
| 6-CH$_3$CH$_2$ | 7-CH$_3$CH$_2$ |
| 5-CH$_3$CH$_2$CH$_2$ | H |
| 7-CH$_3$CH$_2$CH$_2$ | H |
| 5-CH$_3$CH$_2$CH$_2$ | 8-CH$_3$CH$_2$CH$_2$ |
| 6-CH$_3$CH$_2$CH$_2$CH$_2$ | H |
| 7-CH$_3$CH$_2$CH$_2$CH$_2$CH$_2$ | 8-CH$_3$CH$_2$CH$_2$CH$_2$ |
| 5-CH$_3$O | H |
| 8-CH$_3$O | H |
| 5-CH$_3$O | 8-CH$_3$O |
| 7-CH$_3$CH$_2$O | H |
| 6-CH$_3$CH$_2$O | 7-CH$_3$CH$_2$O |
| 6-CH$_3$CH$_2$CH$_2$O | H |
| 5-CH$_3$CH$_2$CH$_2$O | H |
| 6-CH$_3$CH$_2$CH$_2$O | 8-CH$_3$CH$_2$CH$_2$O |
| 7-CH$_3$CH$_2$CH$_2$CH$_2$O | H |
| 5-CH$_3$CH$_2$CH$_2$CH$_2$O ) | 6-CH$_3$CH$_2$CH$_2$CH$_2$O |
| 6-CH$_3$CO | H |
| 8-CH$_3$CO | H |
| 5-CH$_3$CO | 6-CH$_3$CO |
| 7-CH$_3$CH$_2$CH$_2$CO | H |
| 5-CH$_3$CH$_2$CH$_2$CO | 8-CH$_3$CH$_2$CH$_2$CO |
| 5-CH$_3$CONH | H |
| 6-CH$_3$CONH | H |
| 6-CH$_3$CONH | 7-CH$_3$CONH |
| 8-CH$_3$CH$_2$CH$_2$CONH | H |
| 6-CH$_3$CH$_2$CH$_2$CONH | 8-CH$_3$CH$_2$CH$_2$CONH |
| 5-CH$_3$S | H |
| 5-CH$_3$S | 6-CH$_3$S |
| 6-CH$_3$CH$_2$S | H |
| 7-CH$_3$CH$_2$CH$_2$CH$_2$S | H |
| 7-CH$_3$CH$_2$CH$_2$CH$_2$S | 8-CH$_3$CH$_2$CH$_2$CH$_2$S |
| 5,6-CH$_2$O$_2$ | |
| 7,8-CH$_2$O$_2$ | |
| 5,6-CH$_2$CH$_2$O$_2$ | |
| 6,7-CH$_2$CH$_2$O$_2$ | |
| 7,8-CH$_2$CH$_2$O$_2$ | |

EXAMPLE VIII

Following the procedure in Example I, 1-carbethoxy-1,2,3,4-tetrahydrocarbazole is prepared by the reaction of 2-carbethoxy-6-bromo-cyclohexanone and aniline.

To a solution of 1-carbethoxy-1,2,3,4-tetrahydrocarbazole in dimethylformamide is added an equimolar amount of 50% sodium hydride suspension. After allowing the mixture to stir at room temperature for 20 minutes, an equimolar quantity of methyl chloride is added dropwise over a period of 30 minutes. The reaction mixture is heated at 80° C. for 3 hours, and is then cooled, and added to an equal volume of water. Removal of the solvent in vacuo provides 1-carbethoxy-1,2,3,4-tetrahydro-9-methylcarbazole.

1,2,3,4-tetrahydro-1-aminomethyl-9-methylcarbazole is then prepared further following the methods as described in Example I.

EXAMPLE IX

Following the procedure as outlined in Examples I and VIII, 1,2,3,4-tetrahydro-1-aminomethyl-9-butyl carbazole is prepared using n-butyl chloride as the alkylating agent instead of methyl chloride as described in Example VIII.

EXAMPLE X

The following compounds are also made using the procedure as outlined in Examples I and VIII wherein $R_3$ is a methyl group:

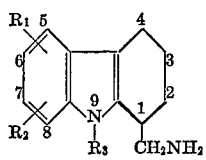

| $R_1$ | $R_2$ |
|---|---|
| 7-F | H |
| 6-Cl | 7-Cl |
| 6-CF$_3$ | H |
| 5-CH | H |
| 7-CH$_3$ | H |
| 8-CH$_3$CH$_2$CH$_2$CH$_2$ | H |
| 5-CH$_3$O | H |
| 6-CH$_3$CH$_2$CH$_2$O | H |
| 6-CH$_3$CO | H |
| 7-CH$_3$CH$_2$CH$_2$CO | H |
| 5-CH$_3$CONH | H |
| 7-CH$_3$CH$_2$CH$_2$CONH | H |
| 6-CH$_3$S | H |
| 7-CH$_3$CH$_2$CH$_2$S | H |
| 5,6-CH$_2$O$_2$ | |
| 5,6-CH$_2$CH$_2$O$_2$ | |

EXAMPLE XI

Compounds containing the same $R_1$ and $R_2$ substituents as in Example X are prepared by the procedure as outlined in Examples I and IX, wherein $R_3$ is n-butyl.

EXAMPLE XII

To a solution of 1,2,3,4 - tetrahydro - 1 - aminomethylcarbazole in dimethylformamide is added an equimolar quantity of diisopropylethylamine followed by the dropwise addition of an equimolar amount methyl chloride. The resulting reaction mixture is heated to 60° C. for 30 minutes, followed by cooling and the addition of an equal volume of water. The suspension is made basic, and the product extracted with diethyl ether. The ether layer is dried and the solvent removed in vacuo. The residual 1,2,3-tetrahydro - 1 - (N-methylaminomethyl)carbazole is purified by recrystallization from ether.

EXAMPLE XIII

Using 1,2,3 - tetrahydro - 1 - (N - methyl aminomethyl)carbazole as starting material the procedure of Example XII is repeated to produce 1,2,3,4 - tetrahydro-1-(N,N-dimethylaminomethyl)carbazole.

EXAMPLE XIV

The following compounds are prepared by procedures similar to those described in Examples VIII, XII, and XIII by the use of appropriately substituted reactants:

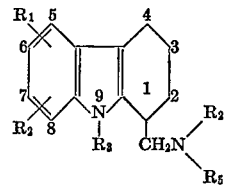

| $R_1$ | $R_2$ | $R_3$ | $R_4$ | $R_5$ |
|---|---|---|---|---|
| 7—F | H | CH$_3$ | CH$_3$ | CH$_3$ |
| H | H | CH$_3$ | CH$_2$CH$_2$CH$_2$CH$_2$ | CH$_2$CH$_2$CH$_2$CH$_3$ |
| 6—CH$_3$ | 7—CH$_3$ | CH$_3$ | CH$_3$ | CH$_3$ |
| 5—CH$_3$ | 7—CH$_3$ | CH$_2$CH$_2$CH$_2$CH$_3$ | CH$_3$ | CH$_3$ |
| 5—CH$_3$ | 6—CH$_3$ | CH$_3$ | CH$_3$<br>C—CH$_3$<br>CH$_3$ | CH$_3$<br>C—CH$_3$<br>CH$_3$ |

EXAMPLE XV

To a solution of 1 - carbethoxy - 1,2,3,4 - tetrahydrocarbazole is added three equivalents of dimethylamine and the mixture sealed in an autoclave. The reaction temperature is raised to 150° C. for three hours, after which time the reaction is cooled, and the solvent and excess amine removed in vacuo. The amide product is purified by recrystallization.

The abovementioned amide is then treated with lithium aluminum hydride in tetrahydrofuran as in Example I to yield 1,2,3,4 - tetrahydro - 1 - (N,N - dimethylaminomethyl)carbazole.

EXAMPLE XVI 1,2,3,4 - tetrahydro - 1 - (N,N-dimethylaminomethyl)-9-methylcarbazole is produced by a procedure similar to that of Example XV using 1-carbethoxy - 1,2,3,4 - tetrahydro-9-methyl carbazole and dimethylamine as reactants.

EXAMPLE XVII

The hydrochloric acid addition salt of 1,2,3,4 - tetrahydro - 1 - aminomethylcarbazole is prepared by mixing an acetone solution of the free base with an aqueous solution of hydrochloric acid and evaporating the resultant solution.

Other acid addition salts of the new aminomethylcarbazole compounds of the present invention described in the above examples are prepared by this same procedure employing acetic acid, hydrobromic acid, hydriodic acid, nitric acid, citric acid, phosphoric acid, tartaric acid, sulfuric acid, lactic acid and maleic acid.

EXAMPLE XVIII

In the screening program to determine the effectiveness of the herein disclosed compounds as coccidiostats, *Eimeria tenella* is used as the test organism, since said organism is probably the most widely occuring species. Young chickens receive drugs per os at a concentration approximately equivalent to 0.1 percent in the feed once daily for five consecutive days. The dose used is calculated on the basis of the average amount of food that is consumed per day by a bird ten days of age. It is calculated that 20 mg. of drug per chick per day is equivalent to 0.1 percent in the feed. The drugs are administered in the morning and subsequently innoculated with *E. tenella* in the afternoon. On the second, third, fourth, and fifth days, the drugs are given to complete the treatments. Test results are held until the eighth day after inoculation, when they are sacrificed and examined for evidence of infection.

The efficiency of the drug is judged by its ability to prevent mortality and by comparison of the pathologic index with that of unmedicated or infected controls. Weight gains are compared with those of infected controls, unifected controls, and positive drug controls. At necropsy, the degree of pathologic involvement is expressed as the average degree of infection (A.D.I.) based on the following schemes:

0—No lesions in the cecum
1—Slight lesion formation in the cecum
2—Moderate lesion formation in the cecum
3—Severe lesion formation in the cecum
4—Death due to infection Compounds, which show actiivty in the above said evaluation, are evaluated further by use of conventional drug-diet method wherein. The drug-diet method consists of administering medicated feeds prepared by the mixing of drugs at different levels in the feed, said medicated feeds introduced at least one day prior to exposure to coccidia and continued as libitum through the life cycle of the test organism.

The following test results are obtained by the application of the aforementioned testing procedures:

Anticoccidial activity in *E. tenella* infected chicks (drug-diet method)

| Compound | Dose, percent in feed | Weight gain, percent of infected control | A.D.I. |
| --- | --- | --- | --- |
| 6,7-methylene-dioxy 1,2,3,4-tetrahydro-1-aminomethylcarbazole | 0.03 | 89 | 0.4 |
| Infected control | | 68 | 3.0 |
| Weight control | | 100 | 0.0 |

What is claimed is:

1. An aminomethylcarbazole compound selected from the group consisting of 1,2,3,4-tetrahyro-1-aminomethylcarbazole bases of the formula:

$R_1$ and $R_2$ form a methylenedioxy or ethylenedioxy ring; and $R_3$, $R_4$ and $R_5$ are each selected from the group consisting of hydrogen and alkyl having up to four carbon atoms.

2. A compound of claim 1 wherein $R_1$ and $R_2$ are methylenedioxy.

3. A compound of claim 1 wherein $R_3$, $R_4$ and $R_5$ are each hydrogen and $R_1$ and $R_2$ are methylenedioxy at the 6,7-positions.

References Cited

UNITED STATES PATENTS 3,634,420   1/1972   Littell et al. _____ 260—247.5 R

OTHER REFERENCES

Grandbery et al., Zhur. Obshchei Khim. 30, 3108–11 (1960); C. A. 55: 16546d Shaw et al., J. Am. Chem. Soc. 79, 3561–4 (1957).

HENRY R. JILES, Primary Examiner

G. T. TODD, Assistant Examiner

U.S. Cl. X.R.

424—274